(12) United States Patent
Nakaya et al.

(10) Patent No.: US 12,049,132 B1
(45) Date of Patent: Jul. 30, 2024

(54) FUEL TANK

(71) Applicant: YACHIYO INDUSTRY CO., LTD., Saitama (JP)

(72) Inventors: Kazunari Nakaya, Tochigi (JP); Masaki Morisaki, Tochigi (JP)

(73) Assignee: YACHIYO INDUSTRY CO., LTD., Saitama (JP)

(*) Notice: Subject to any disclaimer, the term of this patent is extended or adjusted under 35 U.S.C. 154(b) by 0 days.

(21) Appl. No.: 18/291,049

(22) PCT Filed: Jul. 14, 2022

(86) PCT No.: PCT/JP2022/027651
§ 371 (c)(1),
(2) Date: Jan. 22, 2024

(87) PCT Pub. No.: WO2023/008206
PCT Pub. Date: Feb. 2, 2023

(30) Foreign Application Priority Data

Jul. 26, 2021 (JP) .................................. 2021-121294

(51) Int. Cl.
*B60K 15/03* (2006.01)
(52) U.S. Cl.
CPC ..................................... *B60K 15/03* (2013.01)
(58) Field of Classification Search
CPC .................. B60K 15/03; B60K 15/073; B60K 2015/0775
See application file for complete search history.

(56) References Cited

U.S. PATENT DOCUMENTS

| | | | |
|---|---|---|---|
| 4,179,036 A | 12/1979 | Pasini | |
| 6,138,859 A | 10/2000 | Aulph et al. | |
| 2009/0139994 A1 | 6/2009 | Aoki et al. | |
| 2009/0230133 A1 | 9/2009 | Takeuchi et al. | |
| 2015/0343899 A1 | 12/2015 | Furusawa | |
| 2015/0367726 A1 | 12/2015 | Taniguchi et al. | |
| 2016/0114675 A1 | 4/2016 | Nagasaku | |
| 2017/0232835 A1 | 8/2017 | Diestelhorst et al. | |
| 2018/0079299 A1 | 3/2018 | Tsukahara | |

(Continued)

FOREIGN PATENT DOCUMENTS

| | | |
|---|---|---|
| CN | 104918814 A | 9/2015 |
| CN | 104955670 A | 9/2015 |
| CN | 107148364 A | 9/2017 |

(Continued)

OTHER PUBLICATIONS

Written Opinion dated on Sep. 27, 2022 for PCT/JP2022/027651.
(Continued)

*Primary Examiner* — Stephen J Castellano
(74) *Attorney, Agent, or Firm* — KENEALY VAIDYA LLP (57) ABSTRACT

A fuel tank is provided that has a carrier enhanced in rigidity and has a built-in component arranged with high accuracy. The fuel tank has a built-in component exclusively within an interior of a tank body, the built-in component including pillars and a carrier connecting between the pillars to present a ring shape in a planar view, wherein the carrier includes: outer extensions connecting between the pillars so as to form the ring shape; inner extensions extending inward of the ring shape from connection points between the outer extensions, and a coupling stand having the inner extensions joined thereto.

4 Claims, 13 Drawing Sheets

(56) References Cited

U.S. PATENT DOCUMENTS

2018/0134150 A1    5/2018  Matsuzaki
2019/0128227 A1    5/2019  Amano et al.

FOREIGN PATENT DOCUMENTS

| CN | 107531144 A    | 1/2018  |
| CN | 107531145 A    | 1/2018  |
| JP | 2004090698 A   | 3/2004  |
| JP | 2009-132297 A  | 6/2009  |
| JP | 2010-168022 A  | 8/2010  |
| JP | 2015058715 A   | 3/2015  |
| JP | 2019-077382 A  | 5/2019  |
| KR | 20200078203 A  | 7/2020  |
| WO | 2016/174936 A1 | 11/2016 |
| WO | 2022/172695 A1 | 8/2022  |

OTHER PUBLICATIONS

Third Party Observation dated on Sep. 18, 2023 for PCT/JP2022/027651.
Chinese Office Action for the related Chinese Patent Application No. 202280044995.4 dated Apr. 21, 2024.

FUEL TANK

CROSS-REFERENCE TO RELATED APPLICATION

This application is a U.S. National Stage Application under 35 U.S.C § 371 of International Patent Application No. PCT/JP2022/027651 filed on Jul. 14, 2022, which claims the benefit of priority to Japanese Patent Application No. 2021-121294 filed on Jul. 26, 2021, the disclosures of all of which are hereby incorporated by reference in their entireties.

TECHNICAL FIELD

The present invention relates to a fuel tank.

BACKGROUND ART

There has been a built-in component for a fuel tank, where the built-in component includes pillar members fusion-bonded to an inner surface of an outer wall of the fuel tank and beam members (carriers) integrally connecting between the pillar members, with each pillar member capped with a valve (see Japanese Patent Application Publication No. 2010-168022, for example).

SUMMARY OF THE INVENTION

Problems to be Solved

The built-in component has the pillar members connected by the beam members (carriers) to present a ring shape in a planar view, with each pillar member capped with the heavy valve. Accordingly, there has been a problem that the overall built-in component is likely deformed at a time of manufacturing the fuel tank, to have difficulty in fusion-bonding the pillar members at desired positions within the fuel tank.

The present invention is thus intended to provide a fuel tank having a carrier enhanced in rigidity and having a built-in component arranged with high accuracy.

Solution to Problems

In order to solve the above-identified problem, the present invention provides a fuel tank having a built-in component exclusively within an interior of a tank body of the fuel tank, the built-in component including pillars and a carrier connecting between the pillars to present a ring shape in a planar view, wherein the carrier includes: outer extensions connecting between the pillars so as to form the ring shape; inner extensions extending inward of the ring shape from connection points between the outer extensions, and a coupling stand having the inner extensions joined thereto.

According to the invention, the outer extensions, the inner extensions, and the coupling stand improve rigidity of the carrier in a ring shape, to prevent the carrier from being deformed. This allows for arranging the pillars, connected by the carrier, at desired positions.

In addition, it is preferable that the inner extensions extend inward and upward of the ring shape, and the coupling stand is provided thereon with a part for controlling a change in level of liquid stored in the tank body or pressure within the tank body.

According to the invention, a part such as a valve for detecting fullness is stably arranged at an upper portion in the fuel tank.

Further, it is preferable that at least some of the connection points have fittings into which the pillars are fitted, and at least some of the inner extensions extend from the fitting.

According to the invention, the carrier is more improved in rigidity to further prevent itself from being deformed.

Advantageous Effects of the Invention

The present invention provides a fuel tank having a carrier enhanced in rigidity and having a built-in component arranged with high accuracy.

DETAILED DESCRIPTION OF EMBODIMENTS

First Embodiment

Figure 1:
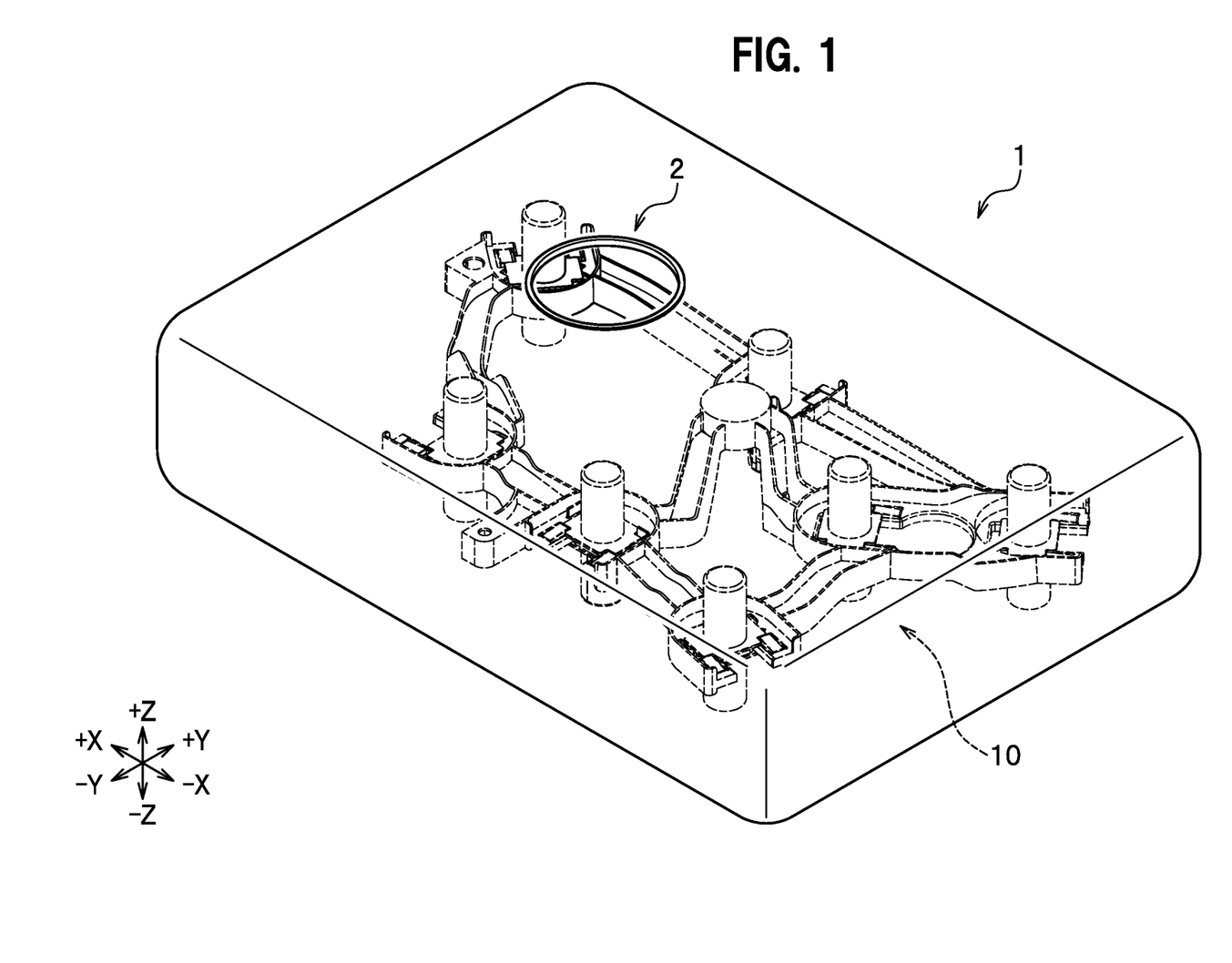
FIG. 1 is a schematic perspective view of a fuel tank according to a first embodiment.

Hereinafter, a first embodiment of the present invention is described. However, the present invention is not limited to the description hereinbelow and the drawings, and can be modified in any way to the extent that advantageous effects of the present invention are not significantly impaired. The present invention can be implemented by combining different embodiments with one another. In the following description, the same components in different embodiments are denoted by the same reference numerals, and duplicate descriptions thereof are omitted. In addition, the same functions in different embodiments have the same names, and duplicate descriptions thereof are omitted FIG. 1 is a schematic perspective view of a fuel tank 1 according to the first embodiment. The fuel tank 1 is shown to have a box shape with a width in a direction X, a depth in a direction Y, and a height in a direction Z. The fuel tank 1 is used for an automobile, for example, to contain gasoline, light oil, or the like. The fuel tank 1 is provided with an aperture 2 through which an oil feed pump (not shown) is set. The oil feed pump feeds fuel in the fuel tank 1 to an engine (not shown).

The fuel tank 1 has a built-in component 10 (to be described below) inside. The built-in component 10 is arranged inside the fuel tank 1 when the fuel tank 1 is blow molded, for example. That is, the built-in component 10 is placed inside a parison (not shown) in a cylindrical shape or between a pair of parisons in a sheet shape, and then the parison(s) is/are molded and cooled to have the built-in component 10 arranged inside the fuel tank 1.

The built-in component 10 is used for absorbing post-molding shrinkage of the fuel tank 1 at a time of cooling after blow molding, absorbing expansion or shrinkage of the fuel tank 1 in use due to a positive or negative pressure inside the tank, and absorbing waves. Post-molding shrinkage is described below, with reference to FIGS. 2 and 3.

Figure 2:
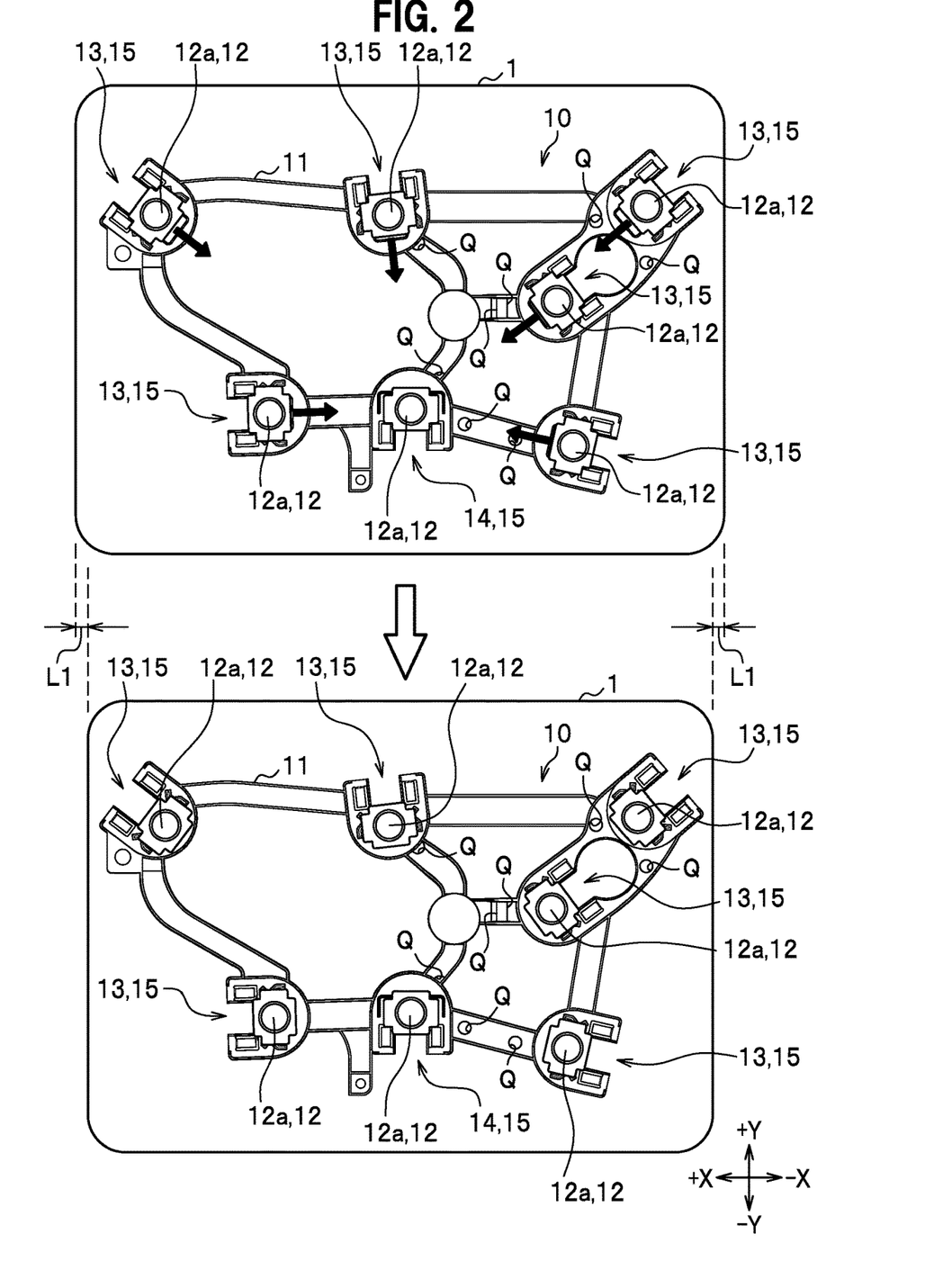
FIG. 2 illustrates a built-in component of the first embodiment absorbing post-molding shrinkage of the fuel tank.

FIG. 2 illustrates the built-in component 10 of the first embodiment absorbing post-molding shrinkage of the fuel tank 1. FIG. 2 shows the inside of the fuel tank 1 visible for the purpose of illustration. Particular configuration of the built-in component 10 is described below, with reference to FIG. 3 and beyond. The built-in component 10 is fixed to the parison (not shown) as a material of the fuel tank 1 on upper surfaces 12a and lower surfaces (not shown) of pillars 12 fitted into fittings 15. Accordingly, forces are applied to the pillars 12 in directions of the pillars being shrunk during post-molding shrinkage due to the parison being cooled.

Post-molding shrinkage is generally homologous deformation. This causes the one or more slidable (movable) pillars 12 (the one or more pillars 12 fitted into one or more slidable fittings 13 to be described below) to be applied with forces towards the fixed pillar 12 (the pillar 12 fitted into a fixed fitting 14 to be described below). Directions of the forces are indicated by solid arrows in an upper diagram in FIG. 2. When forces are applied to the one or more pillars 12 due to post-molding shrinkage of L1 in length, the one or more slidable pillars 12 slide toward the single fixed pillar 12. The built-in component 10 after the sliding is indicated in a lower diagram in FIG. 2.

The one or more slidable pillars 12 sliding toward the fixed pillar 12, as described above, allow for absorbing post-molding shrinkage, which is homologous deformation, to prevent the pillars 12 from being separated or detached from inner walls of the fuel tank 1 due to post-molding shrinkage. As a result, the built-in component 10 is held inside the fuel tank 1 even after post-molding shrinkage, so that the built-in component 10 prevents the fuel tank 10 in use or the like from being deformed.

Figure 3:
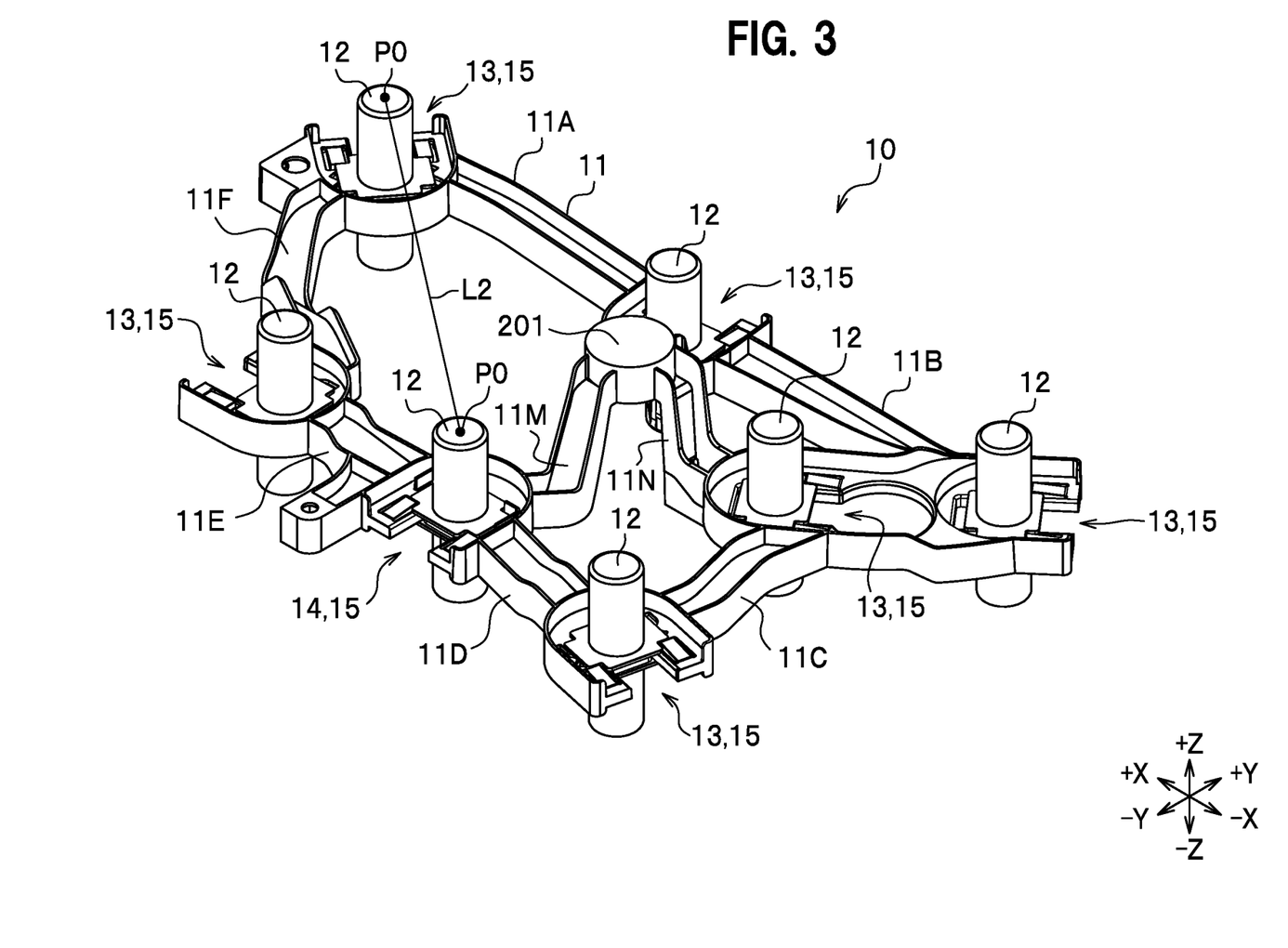
FIG. 3 is a schematic perspective view of the built-in component of the first embodiment.

FIG. 3 is a schematic perspective view of the built-in component 10 of the first embodiment. The built-in component 10 includes a carrier 11, the pillar 12, the slidable fitting 13, and the fixed fitting 14. A distance between the pillar 12 for the slidable fitting 13 having the largest displacement in a X-Y coordinate plane, for example, and the pillar 12 for the fixed fitting 14 is a distance L2. Note that the distance between the pillars 12 is a distance between the centers PO of the pillars 12 in a cylindrical shape. The distances between the pillars 12 are equal to each other in some cases and different from each other in other cases in the drawing, but all the distances may be the same or different from one another.

The carrier 11 is a rigid body having the fittings 15. The fitting 15 is a part having a fitted portion 30 (see FIG. 5) of the pillar 12 fitted thereinto. The number of the fittings 15 is two or more, and may be equal to or greater than two but equal to or smaller than six, or equal to or greater than eight, even though the seven fittings 15 are shown in the drawing.

The carrier 11 is formed to have a frame shape extending in the directions X and Y in the drawings. The carrier 11 being formed to have a frame shape improves rigidity thereof. The carrier 11 is formed of a thermoplastic resin such as polyethylene and polystyrene. A description is given of a shape of the carrier 11, with reference to FIG. 4.

Figure 4:
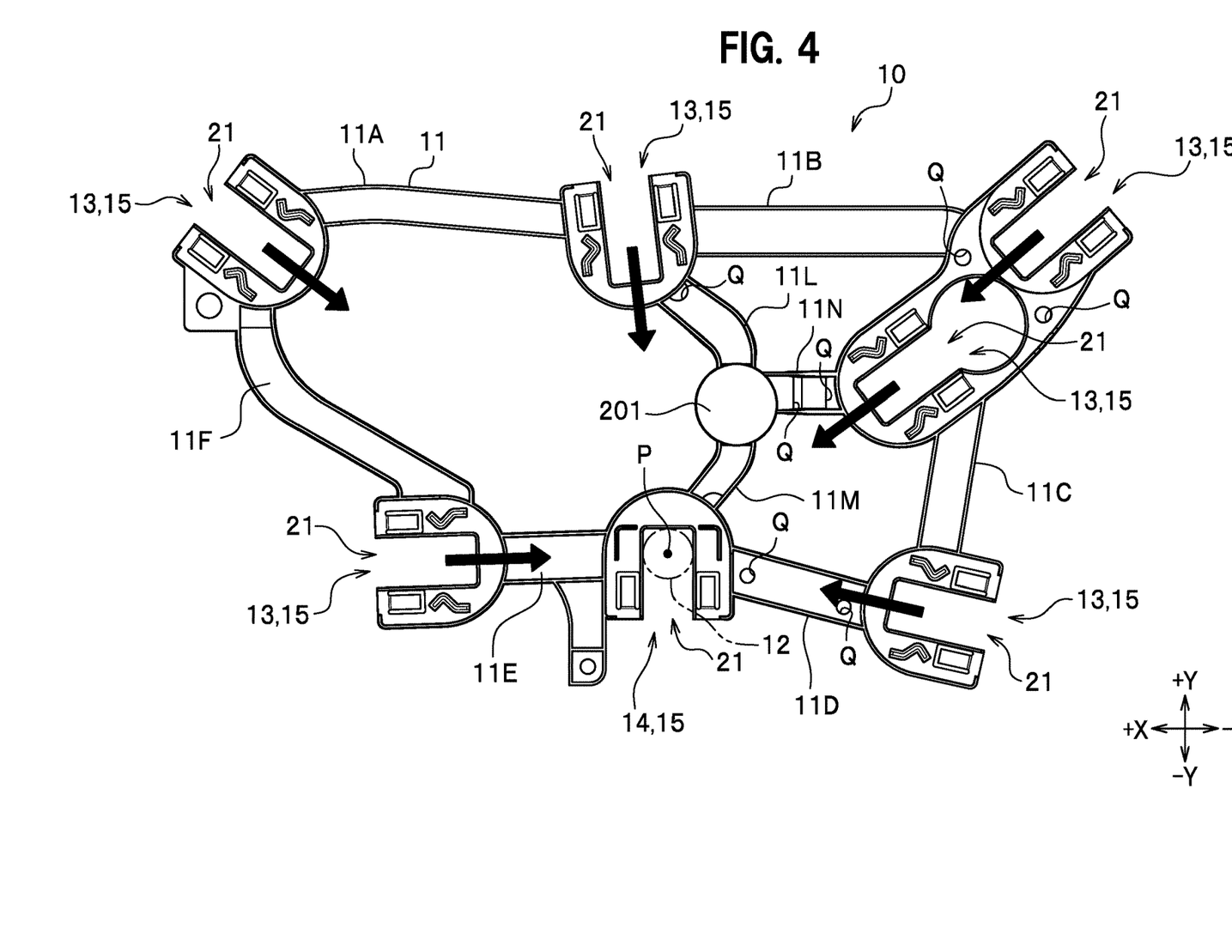
FIG. 4 is a top view of the built-in component of the first embodiment, with pillars removed.

FIG. 4 is a top view of the built-in component 10 of the first embodiment, with the pillars 12 removed. The built-in component 10, more in particular the fitting 15, includes the slidable fitting 13 and the fixed fitting 14. The slidable fitting 13 has the fitted portion 30 (see FIGS. 3 and 5) of the pillar 12 (see FIGS. 3 and 5) slidably fitted into the fitting 15 (here, the slidable fitting 13) of the carrier 11, due to post-molding shrinkage of the fuel tank 1 (see FIG. 1). A sliding direction of the pillar 12 during post-molding shrinkage is defined herein as a slidable direction. The slidable directions are indicated by solid arrows in FIG. 4. The number of the slidable fittings 13 is at least one, and may be equal to or greater than two but equal to or smaller than five, or equal to or greater than seven, even though the six slidable fittings 13 are shown in the drawing.

The fixed fitting 14 is for the fitted portion 30 (see FIGS. 3 and 5) of the pillar 12 (see FIGS. 3 and 5) to be fitted into the fitting 15 (here, the fixed fitting 14) of the carrier 11, so as not to be slidable. The only one fixed fitting 14 is provided in the drawings. FIG. 4 shows the simplified pillar 12 fitted into the fixed fitting 14. A point P is the center of the axis of the pillar 12.

As indicated by the solid arrows in FIG. 4, the slidable direction(s) of at least one (one is acceptable) slidable fitting 13 is/are directed toward the fixed fitting 14. In the drawing, the respective slidable directions of the slidable fittings 13 run through the point P of the pillar 12 (see FIGS. 3 and 5) having the fitted portion 30 (see FIGS. 3 and 5) fitted into the fixed fitting 14. The slidable direction being directed toward the fixed fitting 14 allows for absorbing post-molding shrinkage.

At least one of two ends in the slidable direction of the slidable fitting 13 is open. An opening 21 is formed at said open end. Having either end being open allows the fitted portion 30 (see FIGS. 3 and 5) of the pillar 12 to be fitted into the slidable fitting 13 through the open end. In an example in the drawing, an opposite side of the slidable fitting 13 to the fixed fitting 14 is open and formed to have the opening 21. Forming in this manner prevents the fitted portion 30 from being separated through the opening 21, even when the fitted portion 30 slides in the direction indicated by a solid arrow in FIG. 4 due to post-molding shrinkage.

As shown in FIGS. 3 and 4, the carrier 11 includes outer extensions 11A, 11B, 11C, 11D, 11E, 11F connecting between the pillars 12 so as to form a ring shape, inner extensions 11L to 11N extending inward of the ring shape from connection points between the outer extensions 11A to 11F, and a coupling stand 201 having the inner extensions 11L to 11N joined thereto.

As shown in FIG. 4, the outer extensions 11A to 11F are members connecting outer portions of the carrier 11 so as to form a ring shape in a planar view. More in detail, the outer extensions 11A to 11F connect the adjacent fittings 15 respectively, to form a ring shape. The outer extensions 11A to 11F are plate members in a linear or curved shape, provided with reinforcing ribs. There are six outer extensions provided in the present embodiment, but may suitably be provided according to the number of the fittings 15 (pillars 12).

The coupling stand 201 is provided inside the carrier 11 in a planar view, as shown in FIG. 4. The coupling stand 201 has a flat seat. The coupling stand 201 of the present embodiment has a circular shape in a planar view, but may have another shape. The coupling stand 201 is where a part (such as a cutoff valve to detect a level of filled-up fuel) is arranged for controlling a change in level of liquid (fuel) stored in a tank body or pressure (vapor pressure of the fuel) within the tank body.

The inner extensions 11L to 11N are members to connect the coupling stand 201 with the fittings 15. The inner extensions 11L to 11N are plate members in a linear or curved shape, provided with reinforcing ribs. The inner extensions 11L to 11N extend substantially radially from a peripheral edge of the coupling stand 201. Note that ends of the inner extensions 11L to 11N are connected in the present embodiment to the fittings 15, but may be connected to the pillars 12 and/or the outer extensions. A wording "connection point" in one or more claims is where a portion of the ring of the carrier 11 is connected with the inner extension.

Additionally, the inner extensions 11L to 11N extend upward inside the carrier 11, as shown in FIG. 3. As a result, the coupling stand 201 is positioned inside and above the carrier 11 in a ring shape. In other words, the coupling stand 201 is positioned in an upper portion in the tank body. The number of the inner extensions 11L to 11N is three in the present embodiment, but two or more inner extensions may suitably be provided.

Note that any of the outer extensions 11A to 11F, the inner extensions 11L to 11N, and the fittings 15 may be provided with through-holes Q penetrating therethrough in a direction Z, as shown in FIG. 4. Having the through-holes Q prevents fuel from collecting in the outer extensions 11A to 11F, the inner extensions 11L to 11N, and the fittings 15. The outer extensions 11A to 11F and the inner extensions 11L to 11N are indirectly connected in the present embodiment with the pillars 12 via the fittings 15, but may be directly connected with the pillars 12.

Figure 5:
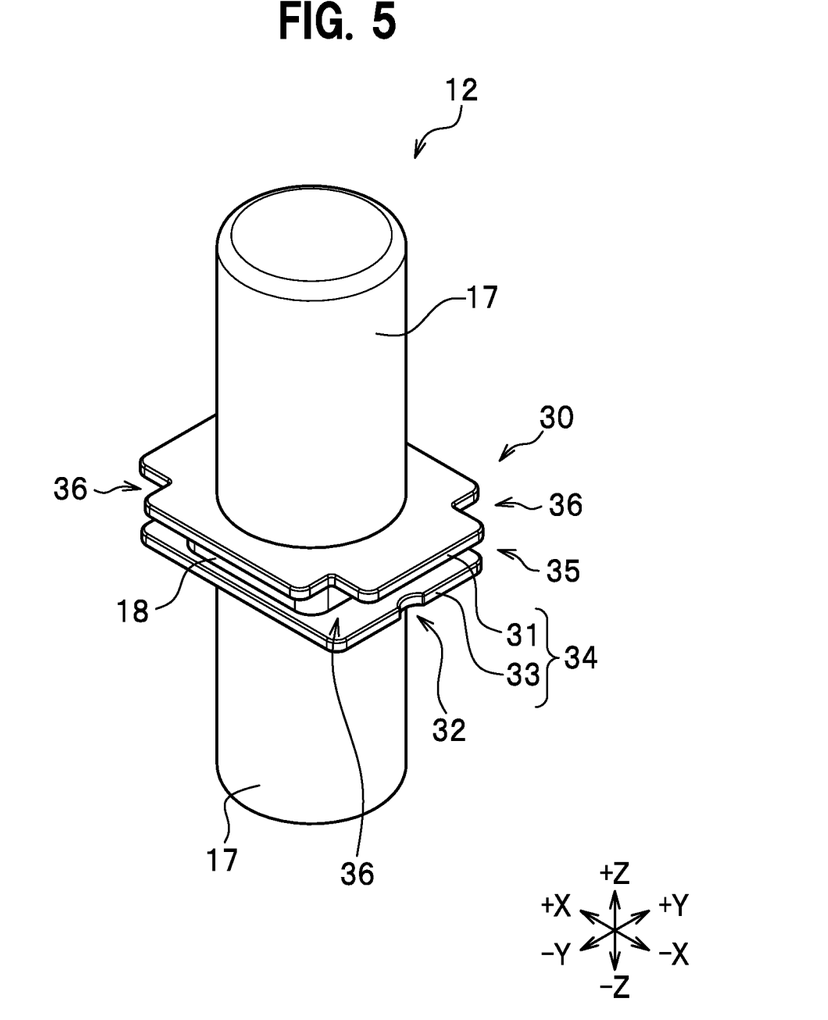
FIG. 5 is a perspective view of the pillar of the first embodiment.

FIG. 5 is a perspective view of the pillar 12 of the first embodiment. In the drawings, the pillar 12 can be fitted into any one of the fittings 15, which are the slidable fittings 13 and the fixed fitting 14, but the pillar 12 to be fitted into the slidable fitting 13 may have a different shape from that to be fitted into the fixed fitting 14.

The pillar 12 includes a support portion 17 in a columnar shape and the fitted portion 30. The fitted portion 30 is a portion to be fitted into each of the fittings 15 of the carrier 11. The support portions 17 having the same shape as each other respectively extend in a direction +Z and a direction −Z from the fitted portion 30. The fitted portion 30 includes a flat plate 31 in a rectangular shape or substantially in a rectangular shape having cutoff portions 36 at four corners. In addition, the fitted portion 30 includes a flat plate 33 in a rectangular shape or substantially in a rectangular shape having notches 32 at two opposed sides of four sides (only the notch 32 at one of the two opposed sides is shown). Here, the wording "substantially in a rectangular shape" means almost in a rectangular shape when viewed from above, even though the shape may not be strictly rectangular. In particular, the corner is not square, for example, but rounded such as by chamfering.

The fitted portion 30 includes a held portion 35. The held portion 35 is a portion held by a flat plate group 34, inclusive of a pair of the opposed flat plates 31, 33, so as to be fitted into the fitting 15 (see FIG. 2). The held portion 35 includes a rectangular column 18, having the same dimensions as a dimension L3 in the direction X and a dimension L4 in the direction Z of the opening 21, between the pair of the flat plates 31, 33, as shown in FIG. 6.

Figure 6:
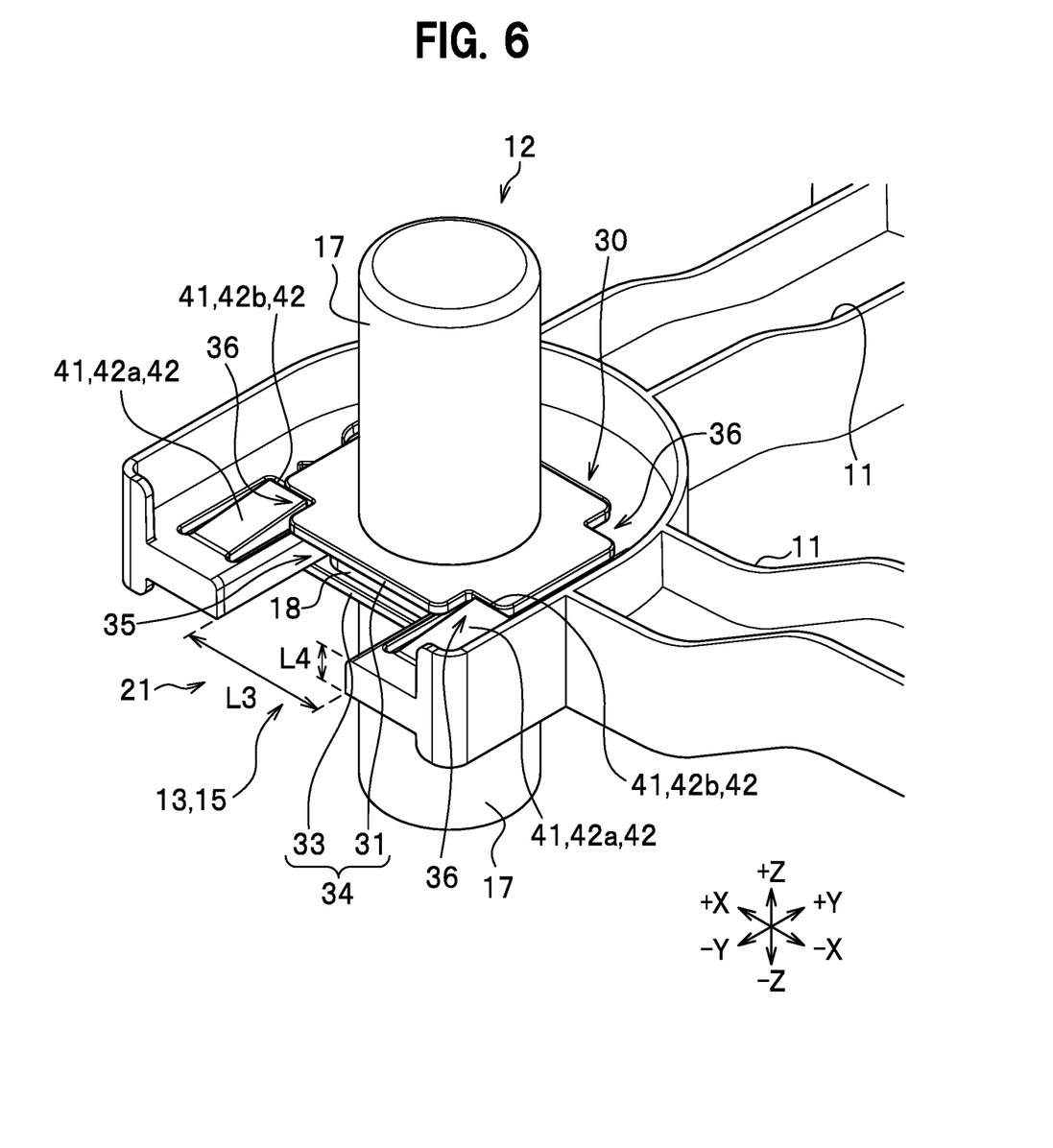
FIG. 6 is a perspective view of a fitted portion of the pillar fitted into a slidable fitting of the first embodiment.

FIG. 6 is a perspective view of the fitted portion 30 of the pillar 12 fitted into the slidable fitting 13 of the first embodiment. The dimension (width) in the direction X of the opening 21 is L3. The distance in the direction X of the slidable fitting 13 (where the held portion 35 is held) is L3 all across in the direction Y of the slidable fitting 13. The distance (height) in the direction Z of the opening 21 is L4. A length in the direction Z of the slidable fitting 13 (where the held portion 35 is held) is also L4. Accordingly, inserting the fitted portion 30 into the slidable fitting 13 through the opening 21 results in the fitted portion 30 fitted with the slidable fitting 13.

The slidable fitting 13 includes a slide restriction member 41 to restrict the fitted portion 30 from sliding toward the open end where the opening 21 is formed. Having the slide restriction member 41 prevents the fitted portion 30 fitted with the sliding fitting 13 from separating through the opening 21.

The slide restriction member 41 is formed of a stop 42 having a slope 42a sloping upward from a near side (direction −Y), closer to the open end where the opening 21 is formed, toward a far side (direction +Y). Areas around three sides of the stop 42, except a front side, are cut in to make a back end of the stop 42 a free end so that the stop 42 is elastically deformable. Having the stop 42 allows the fitted portion 30 to be slid in the direction +Y, with the slope 42a pushed down in the direction −Z, when the fitted portion 30 is inserted through the opening 21. Once the fitted portion 30 is slid beyond a far end 42b of the stop 42, the slope 42a comes up in the direction +Z by a reaction force to engage the fitted portion 30 with the slidable fitting 13.

Figure 7:
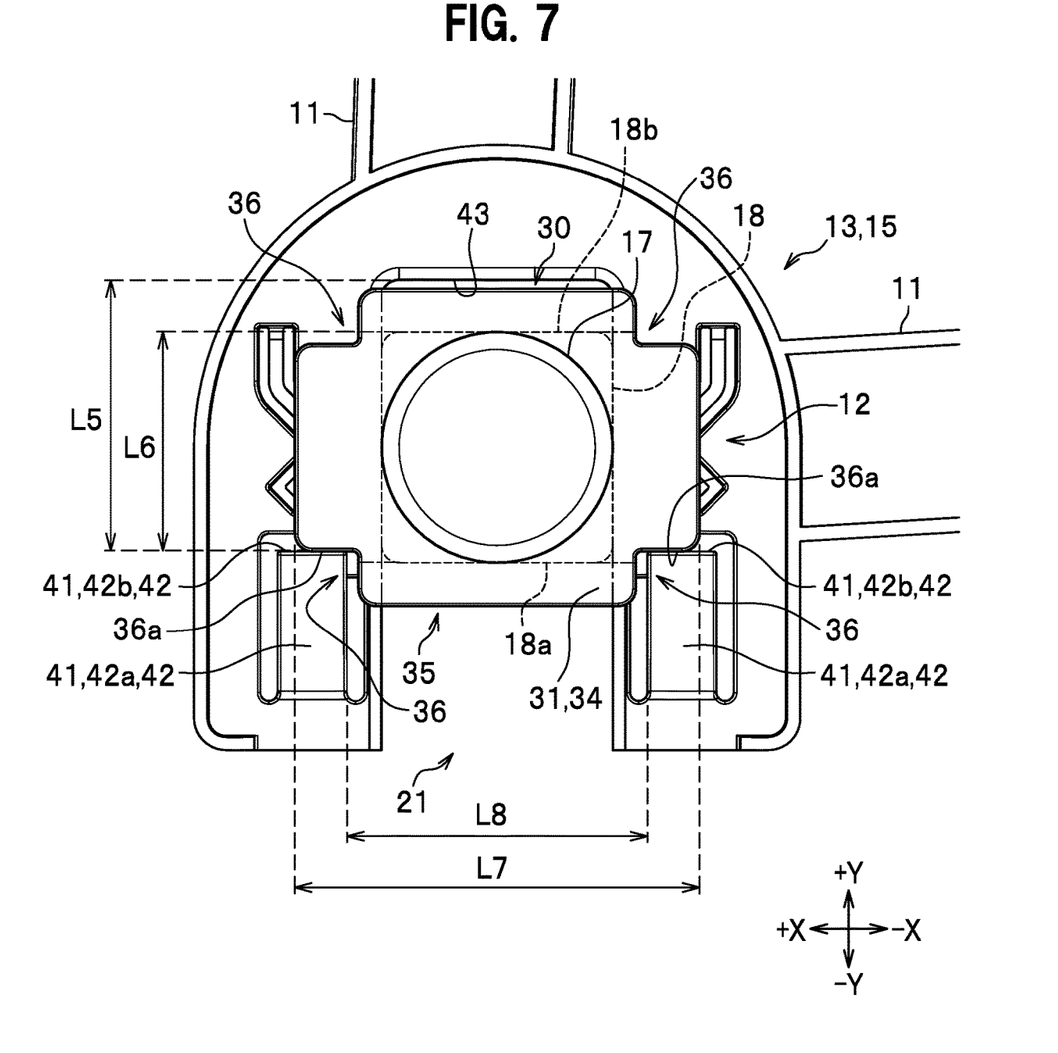
FIG. 7 is a top view of a scene in FIG. 6.

FIG. 7 is a top view of a scene in FIG. 6. FIG. 7 shows the scene in FIG. 6 when viewed from direction +Z toward the direction −Z. Engagement of the fitted portion 30 with the slidable fitting 13 is implemented by end surfaces 36a of the two cutoff portions 36, closer to the opening 21, contacting the ends 42b of the stops 42. When the cutoff portions 36 are engaged with the stops 42, positions in the direction Y of the ends 42b of the stops 42 are substantially aligned with a position in the direction Y of a front end 18a of the rectangular column 18.

In the slidable fitting 13, a distance between an end surface 43, on the far side (opposite side to the opening 21) as viewed from the opening 21, and the end 42b of the stop 42 is L5. In the pillar 12, a distance between an end surface 18b in the direction +Y of the rectangular column 18 and the end surface 36a in the direction −Y of the cutoff portion 36 is L6. The distance L5 is longer than the distance L6. This allows the pillar 12 to slide in a slidable range defined between the end surface 43 and the end 42b. A sliding amount in the slidable range, when the pillar 12 slides, is obtained by subtracting the distance L6 from the distance L5.

A length in the direction X of the flat plate 31 is L7. A distance between the slide restriction members 41 is L8. The length L7 is longer than the distance L8. This causes the flat plate 31 to be caught by the slide restriction members 41 when slid toward the opening 21, to keep the pillar 12 between the end surface 43 of the slidable fitting 13 and the end 42b of the stop 42.

Figure 8:
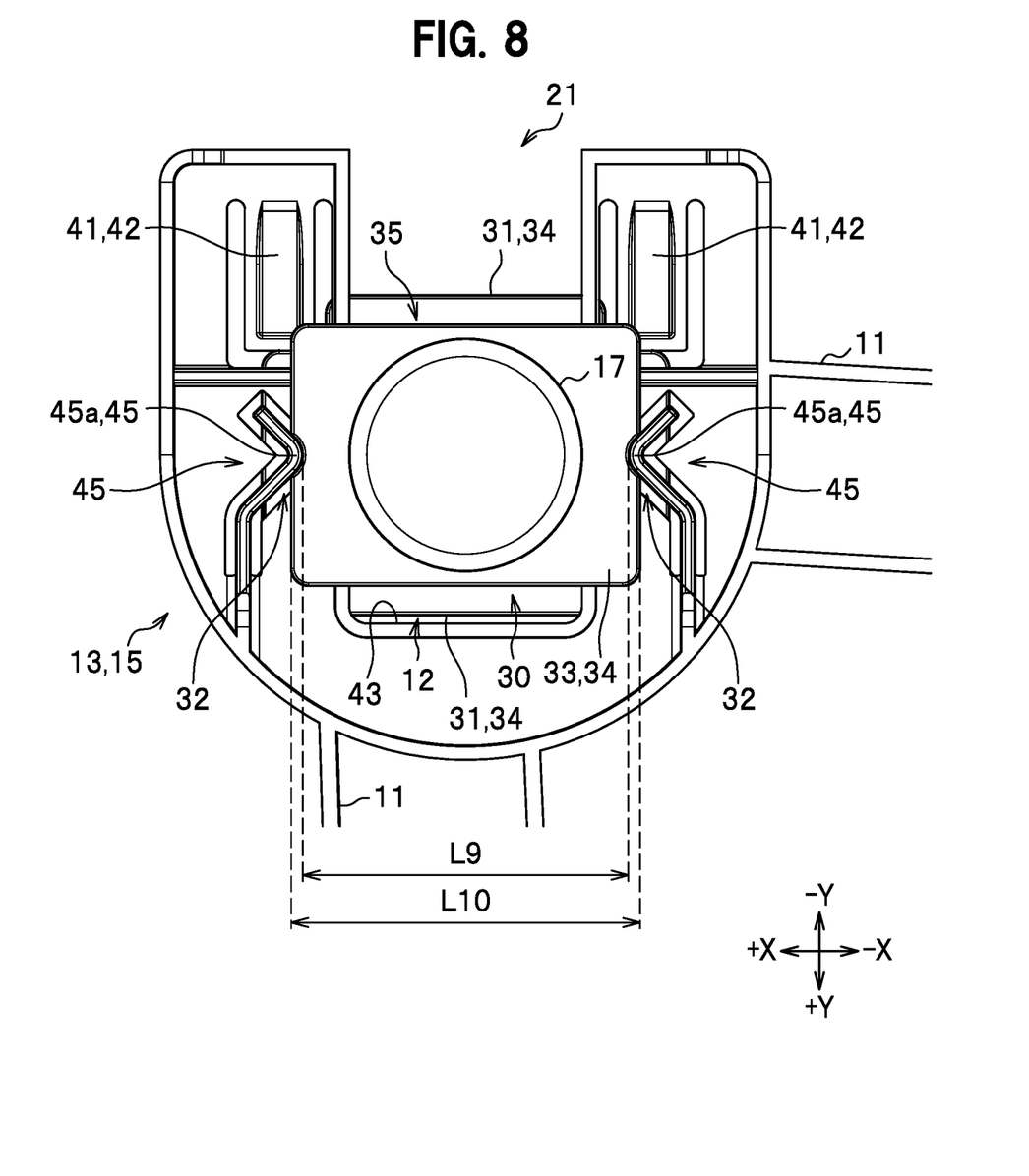
FIG. 8 is a bottom view of the scene in FIG. 6.

FIG. 8 is a bottom view of the scene in FIG. 6. FIG. 8 shows the scene in FIG. 6 when viewed from the direction −Z toward the direction +Z. FIG. 8 shows the end surfaces 36a (see FIG. 7) of the two cutoff portions 36 (see FIG. 7), closer to the opening 21, contacting the ends 42b (see FIG. 7) of the stops 42.

As described above, the flat plate 33 has the notches 32 at two opposed sides of four sides. The slidable fitting 13 has engaging portions 45, at positions facing the notches 32, to engage the pillar 12 in a provisional condition of the fitted portion 30 having been fitted into the slidable fitting 13.

Here, the provisional condition means a condition before post-molding shrinkage, in particular a condition of the parison having been blow molded with the built-in component 10 arranged, but not yet cooled, for example. The slidable fitting 13 thus includes a mechanism of positioning in the slidable direction (direction Y), composed of the engaging portions 45. The engaging portion 45 is a leaf spring, for example, configured to have a bent portion 45a thereof fitted into the notch 32 when no stress is working. Having the engaging portions 45 allows for engaging the pillar 12, in the provisional condition of the fitted portion 30 having been fitted into the slidable fitting 13. This allows the built-in component 10 to be arranged in the fuel tank 1, with the pillars 12 engaged.

The engaging portions 45 are provided in pairs so as to have the pillar 12 in between. A distance in the direction X between a pair of the engaging portions 45 is L9. Note that a distance in the direction X between the notches 32 formed on the two opposite sides is also the distance L9. In addition, a length in the direction X of the flat plate 33 is L10. The length L10 is longer than the distance L9. This allows the engaging portions 45 to engage the pillar 12 having the flat plate 33.

Figure 9:
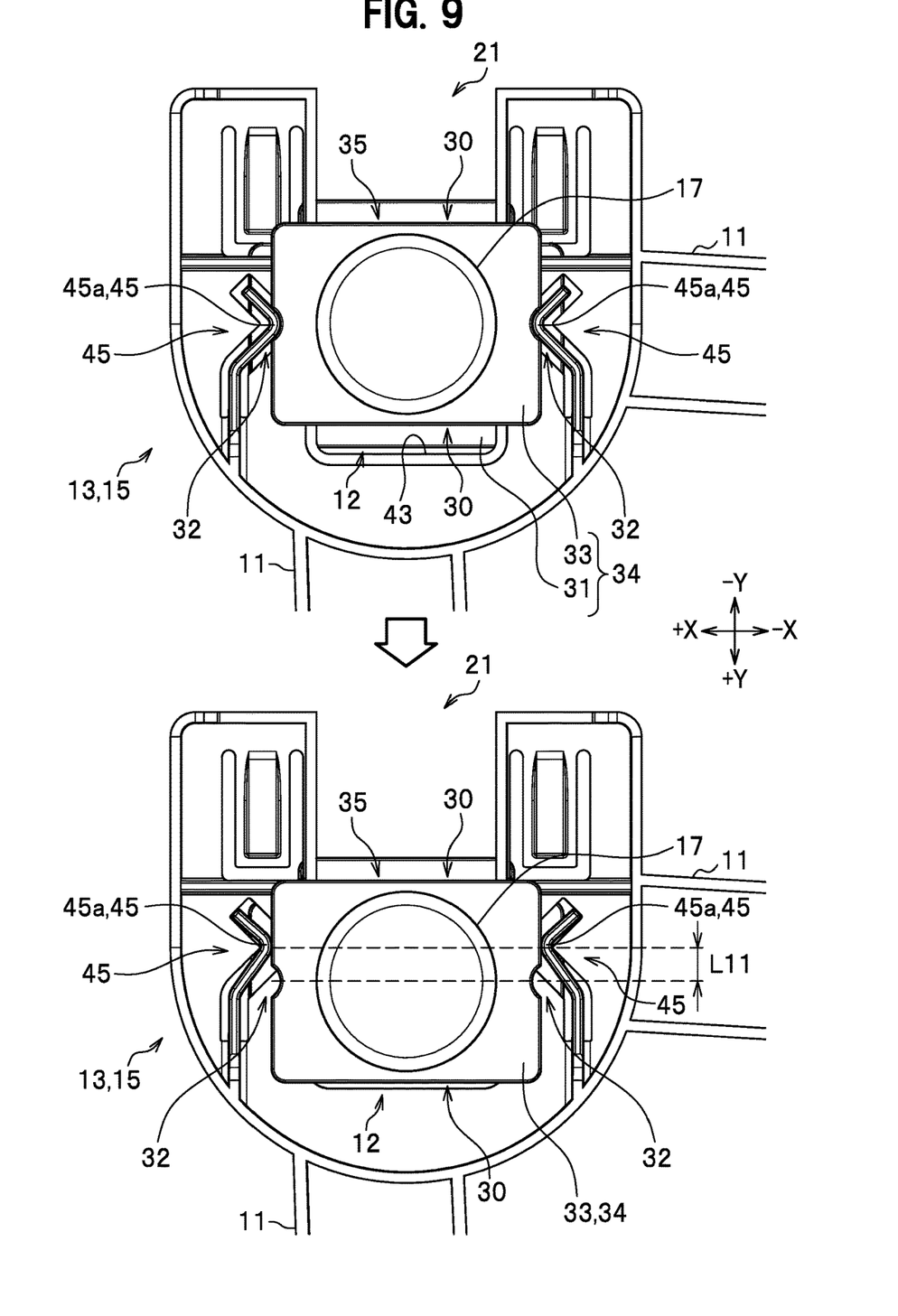
FIG. 9 illustrates the pillar of the first embodiment moving during post-molding shrinkage.

FIG. 9 illustrates the pillar 12 of the first embodiment moving during post-molding shrinkage. As shown in an upper drawing (the same scene as in FIG. 8) in FIG. 9, the notches 32 are engaged in the provisional condition by the engaging portions 45. At this time, the distance in the direction X between the engaging portions 45 is equal to the distance in the direction X between the notches 32, and is the distance L9 (see FIG. 8).

During post-molding shrinkage of the fuel tank 1 (see FIG. 1), with the pillars 12 engaged by the engaging portions 45, the pillars 12 are moved, as described above with reference to FIG. 2, with the positions (in the X-Y coordinate) of the fittings 15 unchanged, that is, with the position of the carrier 11 unchanged. As a result, the pillars 12 have the engagement by the engaging portions 45 released and are slid in the respective slidable ranges toward the fixed fitting 14. The pillars 12 having the engagement released and being slid toward the fixed fitting 14, during post-molding shrinkage, allows for absorbing post-molding shrinkage as homologous deformation by the built-in component 10 having the pillars 12 engaged therewith, as shown in FIG. 2.

As shown in a lower drawing in FIG. 9, the pillar 12 is slid by a sliding amount L11. The sliding amount L11 of the pillar 12 can be determined from the distance between the slidable fitting 13 and the fixed fitting 14, and a rate of shrinkage of a material of the parison (a member of the fuel tank 1 to have post-molding shrinkage) to contain the built-in component 10. The distance between the slidable fitting 13 and the fixed fitting 14 is determined for each pillar 12, for which the sliding amount L11 is to be determined, and in a case of the example in FIG. 3, the sliding amount of the pillar 12 for the slidable fitting 13, which has the largest displacement in the X-Y plane, is determined based on the distance L2, as a distance in the X-Y plane from the pillar 12 for the fixed fitting 14. The rate of shrinkage of the material of the parison to contain the built-in component 10 may be selected from known values depending on the material, or may be determined by experiment or the like.

Once the rate of shrinkage from before and after the post-molding shrinkage is determined, the distance is multiplied by the rate of shrinkage to calculate the magnitude of the post-molding shrinkage, that is, the sliding amount L11 of the pillar 12. The pillar 12 is slid in the slidable range with the distance L5 (FIG. 7) in the direction Y, defined between the end surface 43 of the slidable fitting 13 and the end 42b of the stop 42. In addition, the distance L6 (see FIG. 7) is the distance between the end surface 18b in the direction +Y of the rectangular column 18 and the end surface 36a in the direction −Y of the cutoff portion 36, as described above. Accordingly, as far as a value as a sliding space, obtained by subtracting the distance L6 from the distance L5, is greater than or equal to the sliding amount L11, restricting the pillar 12 from moving by the slidable fitting 13 is controllable during post-molding shrinkage.

A length (length L5) in the slidable direction of the slidable range is preferably a value determined based on a distance between the slidable fitting 13 and the fixed fitting 14 (distance L2 in the example in FIG. 3) and a rate of shrinkage of the material of the parison to contain the built-in component. This allows for estimating the sliding amount during post-molding shrinkage to provide a sufficient slidable range.

Figure 10:
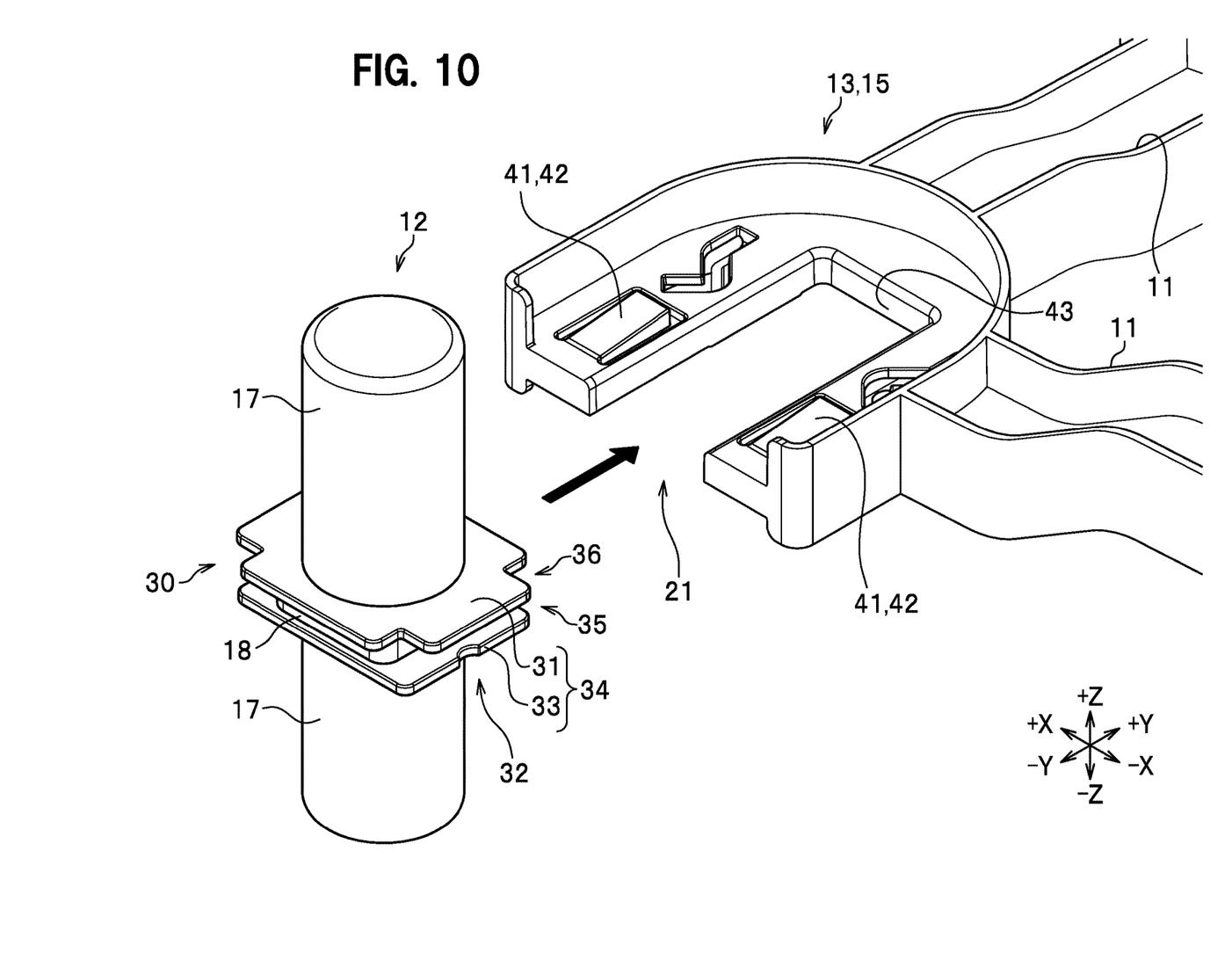
FIG. 10 illustrates the pillar being fitted into the slidable fitting of the first embodiment.

FIG. 10 illustrates the pillar 12 being fitted into the slidable fitting 13 of the first embodiment. Inserting the pillar 12 through the opening 21, as indicated by a solid arrow, accomplishes fitting the pillar 12 into the slidable fitting 13. The pillar 12 is inserted through the opening 21 such that a direction of the slide restriction members 41 being arranged (direction X) is aligned with a longitudinal direction of the flat plate 31 having the length L5. This allows the pillar 12 to be fitted into the slidable fitting 13, as shown in FIGS. 6 to 8.

Figure 11:
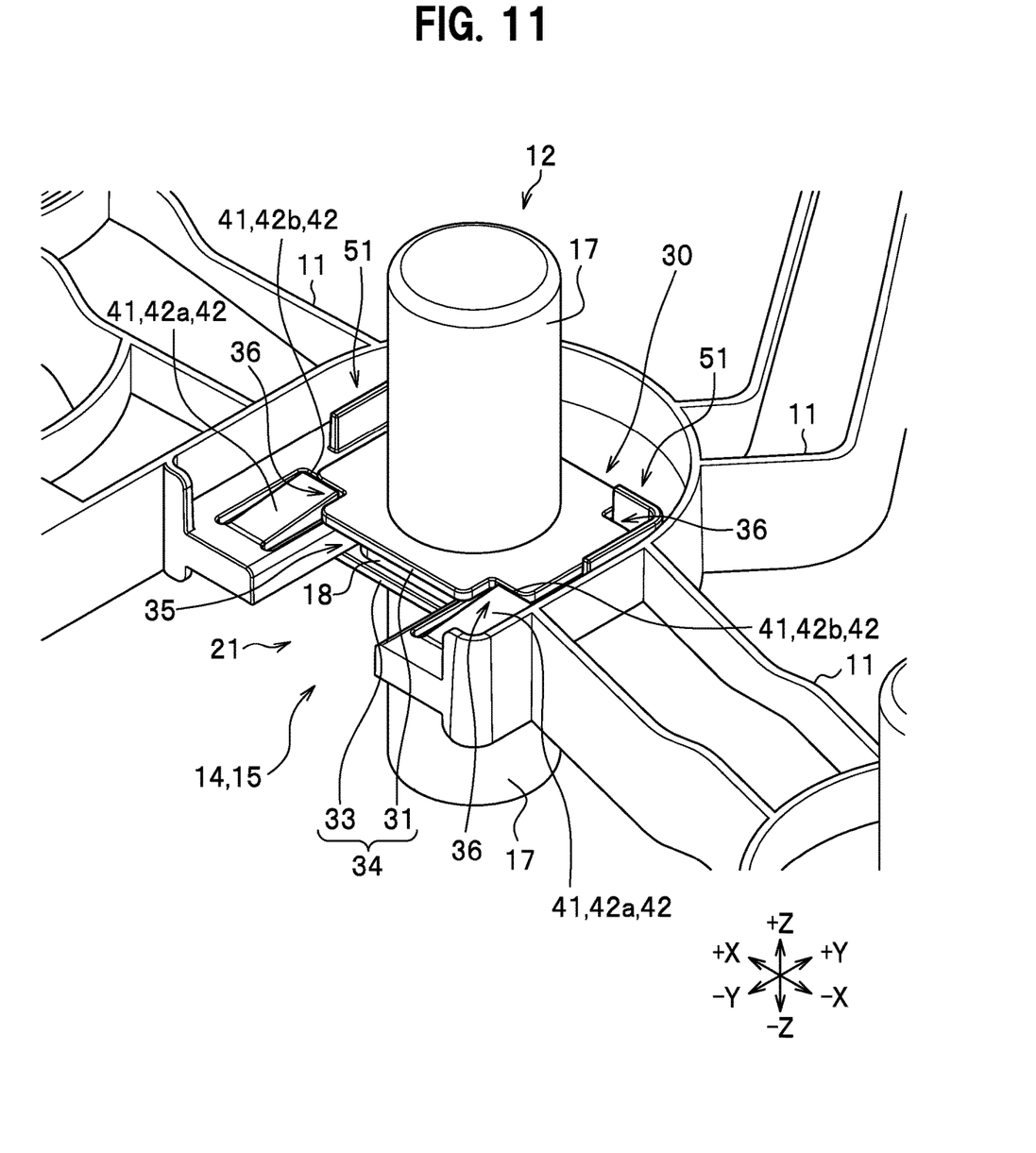
FIG. 11 is a perspective view of a fixed fitting of the first embodiment.

FIG. 11 is a perspective view of the fixed fitting 14 of the first embodiment. The fixed fitting 14 includes the slide restriction members 41 to restrict the held portion 35 of the pillar 12 from sliding, as with the slidable fitting 13. However, the fixed fitting 14 includes a rib 51, which is not included in the slidable fitting 13. The held portion 35 of the pillar 12 is placed between the rib 51 and the slide restriction member 41.

Figure 12:
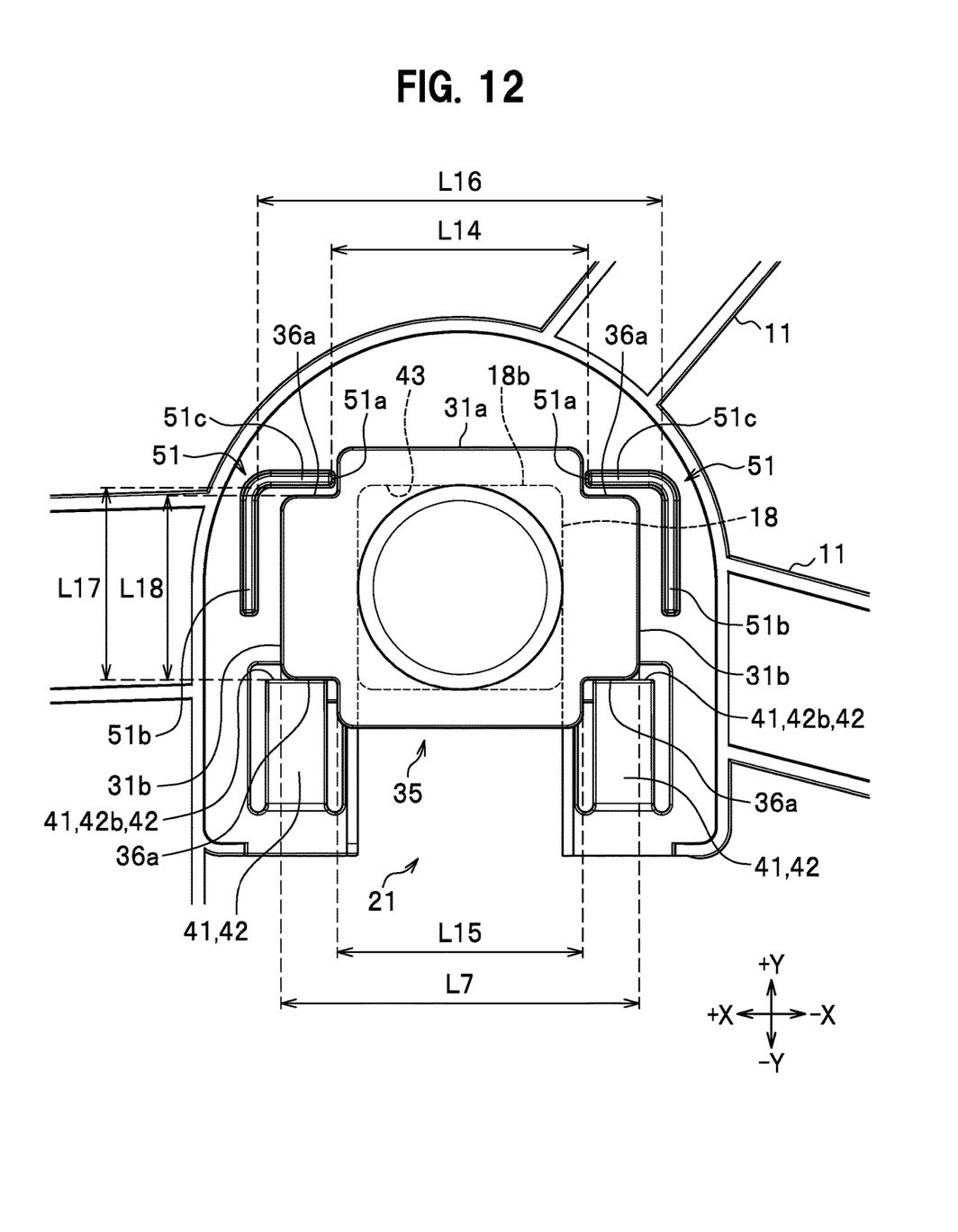
FIG. 12 is a top view of a scene in FIG. 11.

FIG. 12 is a top view of the scene in FIG. 11. A pair of the ribs 51 is provided symmetrically so as to hold the flat plate 31 in between. The rib 51 can have any shape, as far as being capable of restricting a position in the direction Y of the flat plate 31, and may have an L-shape, for example, to extend in two directions of an opening direction (direction Y) of the opening 21 and a direction in parallel to the opening 21 (direction X). In the example in the drawing, the rib 51 includes a rib 51c extending in the direction X, and a rib 51b extending in the direction Y Among these, the rib 51c positions the pillar 12 in the direction X, when the pillar 12 is fixed. The rib 51b guides the pillar 12 being inserted in the direction +Y, when the pillar 12 is inserted through the opening 21.

A distance between an end 51a in the direction −X of one of the ribs 51 and the end 51a in the direction +X of the other of the ribs 51 is L14. The distance L14 is slightly longer than a length L15 of an end surface 31a of an end surface extending in the direction X of the flat plate 31, with end surfaces of the cutoff portions 36 excluded. A part of the flat plate 31 is thus placed between the ends 51a. This positions the pillar 12, having the flat plate 31, in the direction X.

A distance between the ribs 51b is L16. The distance L16 is longer than the length L7 as the length in the direction X of the flat plate 31. The flat plate 31 is thus placed between the ribs 51b. The ribs 51b, extending in the direction Y, of the ribs 51 respectively face end surfaces 31b of the flat plate 31, extending in the same direction (direction Y) as the slidable direction. In addition, the ribs 51c respectively face the end surfaces 36a in the direction Y of the two cutoff portions 36 on the far side from the opening 21. The ribs 51c are arranged on the opposite side of the said end surfaces 36a to the opening 21.

The pillar 12 having the flat plate 31 is fixed by the fixed fitting 14, which is not the case with the slidable fitting 13. The fixed fitting 14 is thus formed with the opening 21 at one end in the slidable direction, which is open, and the end surface 43 (closed end surface) at the other end in the slidable direction. The fixed fitting 14 includes the slide restriction members 41 between the opening 21 and the end surface 43, to restrict the held portion 35 from sliding. The held portion 35 is engaged by the slide restriction members 41 and the end surface 43. In the example shown in the drawing, a position in the direction Y of the end surface 18b of the rectangular column 18 of the held portion 35 is substantially the same as a position in the direction Y of the end surface 43 of the fixed fitting 14. That is, the end surface 18b contacts the end surface 43. In addition, positions in the direction Y of the end surfaces 36a of the two cutoff portions 36, closer to the opening 21, are substantially the same as positions in the direction Y of the ends 42b of the stops 42 of the slide restriction members 41. That is, the ends 42b contact the end surfaces 36a. Configuration in this manner allows the pillar 12 to be fixed in the fixed fitting 14.

A distance between the rib 51c and the end 42b of the slide restriction member 41 is L17. Additionally, a length of the end surface 31b of an end surface extending in the direction Y of the flat plate 31, with end surfaces of the cutoff portions 36 excluded, is L18. The length L17 is longer than the length L18. The flat plate 31 is thus placed between the ends 42b of the slide restriction members 41 and the ribs 51c.

Figure 13:
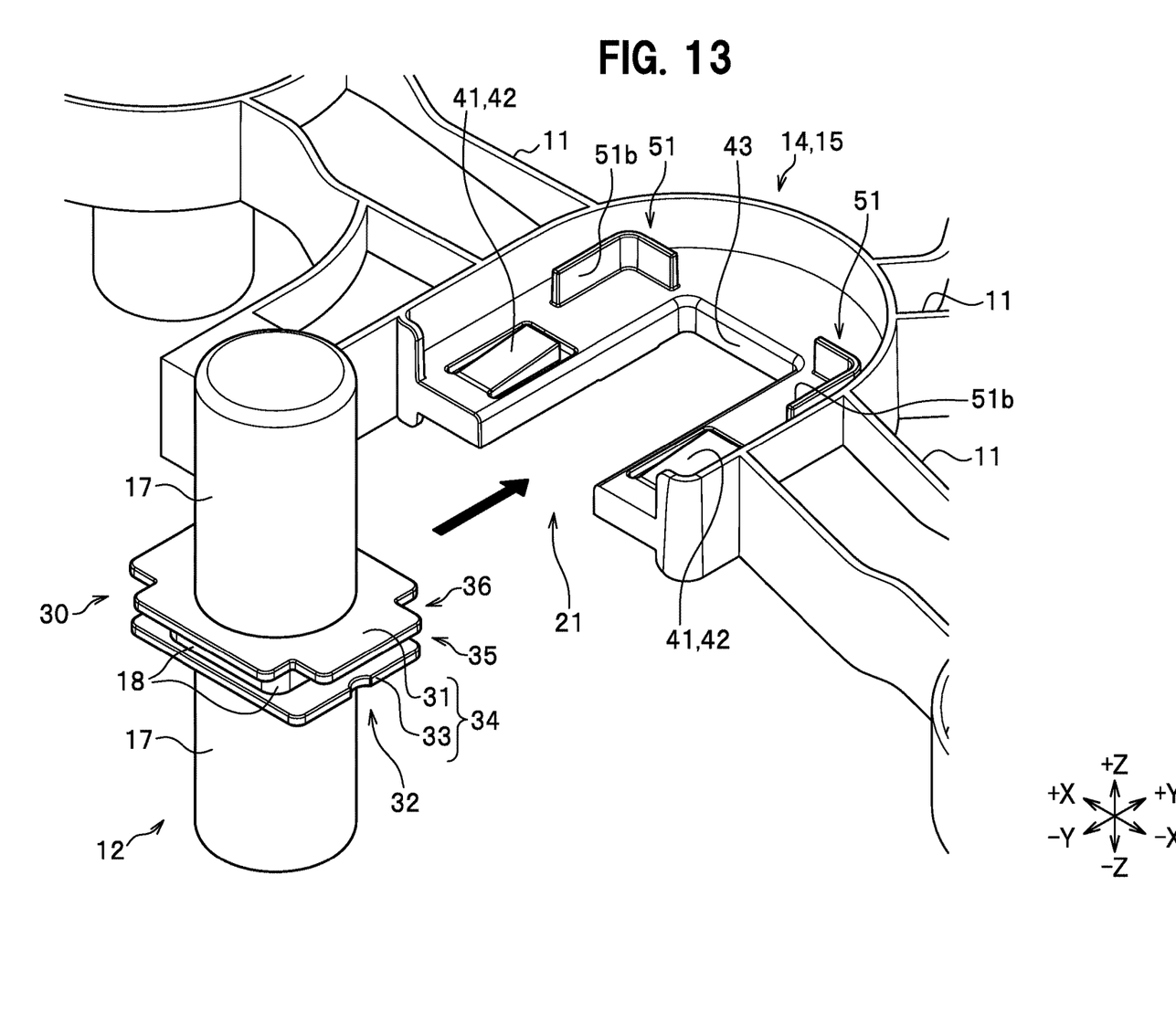
FIG. 13 illustrates the pillar being fitted into the fixed fitting of the first embodiment.

FIG. 13 illustrates the pillar 12 being fitted into the fixed fitting 14 of the first embodiment. Inserting the pillar 12 through the opening 21, as indicated by a solid arrow, accomplishes fitting the pillar 12 into the fixed fitting 14. The pillar 12 is inserted through the opening 21 such that a direction of the slide restriction members 41 being arranged (direction X) is aligned with a longitudinal direction of the flat plate 31 having the length L5. At this time, insertion of the pillar 12 in the direction +Y is guided by the ribs 51b, as described above. This causes the pillar 12 to be fitted into the fixed fitting 14, as shown in FIGS. 11 and 12.

As described above, the fuel tank 1 of the present embodiment has the carrier 11 made from rigid material, to prevent the carrier 11 from being deformed when the built-in component 10 is arranged in the fuel tank 1, so that the built-in component 10 is arranged inside the fuel tank 1 with high accuracy.

More in detail, the pillars 12 are also coupled inside the carrier 11, by the inner extensions 11L to 11N and the coupling stand 201, as well as by the outer extensions 11A to 11F in a ring shape, to have the carrier 11 improved in rigidity to prevent the carrier 11 from being deformed. This allows for positioning the pillars 12, coupled by the carrier 11, at desired positions in the tank body.

In addition, the inner extensions 11L to 11N extend inward and upward of the carrier 11, and the coupling stand 201 is provided thereon with a cutoff valve, for example. This allows for arranging parts, such as a valve to detect a level of filled-up fuel, stably at an upper portion in the fuel tank (at desired positions).

Further, the coupling stand 201 and the fittings 15 are coupled by the inner extensions 11L to 11N so as to form a substantially radial shape, while the coupling stand 201 is provided inside the ring shape of the carrier 11, to enhance the carrier 11 in rigidity with balance.

Still further, the inner extensions 11L to 11N may extend directly from the pillars 12, but preferably extend from the fittings 15, as with the present embodiment. This further improves the carrier 11 in rigidity and further prevents the carrier 11 from being deformed. Note that the connection points of the present embodiment have the fittings 15, into which the pillars 12 are fitted, and all ends of the inner extensions 11L to 11N are connected to the fittings 15, but at least one of the inner extensions may be connected to the same numbers of the fittings 15.

Still further, the slidable directions of the slidable fittings 13 are directed toward the fixed fitting 14. The fuel tank 1 is thus capable of absorbing complex displacements due to post-molding shrinkage thereof more than a conventional fuel tank. This prevents the pillars 12 from being separated from the fuel tank 1 and/or the carrier 11 from being deformed, due to post-molding shrinkage, to improve reliability of the fuel tank 1.

Hereinabove, the embodiment of the present invention has been described, but may be suitably modified in design within the scope of the present invention. For example, the pillars slide in the above-described embodiment at a time of post-molding shrinkage, but the present invention may be applied to a case where no pillars are slidable with respect to the carrier.

LEGEND FOR REFERENCE NUMERALS

1: fuel tank, 10: built-in component, 11: carrier, 11A to 11F: outer extension, 11L to 11N: inner extension, 12: pillar, 13: slidable fitting, 14: fixed fitting, 15: fitting, 30: fitted portion, 32: notch, 33: flat plate, 35: held portion, 36: cutoff portion, 41: slide restriction member, 42: stop, 42a: slope, 42b: end, 43: end surface (closed end surface), 45: engaging portion, and 201: coupling stand.

The invention claimed is:

1. A fuel tank having a built-in component exclusively within an interior of a tank body of the fuel tank, the built-in component comprising:
pillars; and
a carrier connecting between the pillars to present a ring shape in a planar view, wherein the carrier includes:
outer extensions connecting between the pillars so as to form the ring shape,
inner extensions extending inward of the ring shape from connection points between the outer extensions and
a coupling stand having the inner extensions joined thereto.

2. The fuel tank according to claim 1, wherein
the inner extensions extend inward and upward of the ring shape, and
the coupling stand is provided thereon with a part for controlling a change in level of liquid stored in the tank body or pressure within the tank body.

3. The fuel tank according to claim 2, wherein
at least some of the connection points have fittings into which the pillars are fitted, and
at least some of the inner extensions extend from the fittings.

4. The fuel tank according to claim 1, wherein
at least some of the connection points have fittings into which the pillars are fitted, and
at least some of the inner extensions extend from the fittings.

* * * * *